(12) United States Patent
Liu

(10) Patent No.: US 9,963,323 B2
(45) Date of Patent: May 8, 2018

(54) ELEVATOR BALANCE COEFFICIENT DETECTION METHOD AND DEVICE

(71) Applicant: TIANJIN HAOYA TECHNOLOGY DEVELOPMENT CO., LTD, Tianjin (CN)

(72) Inventor: Pei Liu, Tianjin (CN)

(73) Assignee: TIANJIN HAOYA TECHNOLOGY DEVELOPMENT CO., LTD., Tianjin (CN)

( * ) Notice: Subject to any disclaimer, the term of this patent is extended or adjusted under 35 U.S.C. 154(b) by 714 days.

(21) Appl. No.: 14/401,844

(22) PCT Filed: May 17, 2013

(86) PCT No.: PCT/CN2013/075847
§ 371 (c)(1),
(2) Date: Nov. 18, 2014

(87) PCT Pub. No.: WO2013/174243
PCT Pub. Date: Nov. 28, 2013

(65) Prior Publication Data
US 2015/0142339 A1 May 21, 2015

(30) Foreign Application Priority Data

May 22, 2012 (CN) .......................... 2012 1 0163508
May 22, 2012 (CN) .......................... 2012 1 0163584

(51) Int. Cl.
*B66B 5/00* (2006.01)
*G01M 1/00* (2006.01)
(Continued)

(52) U.S. Cl.
CPC .......... *B66B 5/0031* (2013.01); *B66B 5/0037* (2013.01); *G01M 1/00* (2013.01)

(58) Field of Classification Search
CPC ....... B66B 5/0031; B66B 5/0037; G01M 1/00
(Continued)

(56) References Cited

U.S. PATENT DOCUMENTS

| 4,547,732 A * | 10/1985 | Husson .............. G01D 5/24409 324/166 |
| 2001/0017242 A1* | 8/2001 | Tajima ...................... B66B 1/30 187/296 |
| 2013/0018639 A1* | 1/2013 | Sakai ...................... B66B 1/285 703/2 |

FOREIGN PATENT DOCUMENTS

CN 101670965 A * 3/2010

OTHER PUBLICATIONS

Machine Translation of CN 101670965.*

* cited by examiner

*Primary Examiner* — Eman Alkafawi
*Assistant Examiner* — Terence Stifter, Jr.
(74) *Attorney, Agent, or Firm* — Maier & Maier, PLLC

(57) ABSTRACT

An elevator balance coefficient detection method includes the following steps: (1) connecting an electrical energy detection device to a power line of an elevator driving motor, and connecting a speed detection device to a mechanical transmission member of an elevator car; (2) measuring and recording in real time the car speed data and driving motor power data when the car and a counterweight move to a same horizontal location; and (3) based on above detection data and basic parameters of the elevator to be tested, and according to transmission relationship between the elevator's operating condition and energy during operation, calculating and obtaining the value of the balance coefficient. A corresponding device includes an elevator data acquiring system and a detection data processing system. The elevator electrical energy detection device is an AC broadband power (Continued)

measuring device. The elevator speed measuring device is a steel rope displacement measuring device employing a photoelectric mouse chip circuit component or a tachometer type speed measuring device. The invention has the advantages of quick measuring and high accuracy of measuring.

2 Claims, 2 Drawing Sheets

(51) Int. Cl.
    *G01B 5/28*     (2006.01)
    *G01B 5/30*     (2006.01)

(58) Field of Classification Search
    USPC .......................................................... 702/35
    See application file for complete search history.

ELEVATOR BALANCE COEFFICIENT DETECTION METHOD AND DEVICE

FIELD OF THE INVENTION

The present invention relates to a detection method and device, and more particularly, relates to an elevator balance coefficient detection method and device therefor.

BACKGROUND OF THE INVENTION

"Safety specification for elevator manufacture and installation (GB7588-2003)" describes the balance coefficient as follows: it is ratio of the total mass of the rated load and car to balancing weight.

"Lift-testing method (GB/T10059-2009)" and "Regulation for Lift Supervisory Inspection and Periodical Inspection—Traction and Positive Drive Lift (TSG T7001-2009)" set forth the detection method for elevator balance coefficient as follows: the car moves up and down at its full running range with a load of 30%, 40%, 45%, 50% and 60% of its rated load respectively; when the car and its counterweight move to a same horizontal location, the inputted current value of a motor is recorded; after that, current-load curve is plotted to identify the intersection point between the curve of upward movement and downward movement as the balance coefficient.

The above detection method, in which the load is increasingly added to the elevator in certain order, motor current value is recorded, and curve of current-load is plotted to determine the balance coefficient, has the advantage of being practiced using a general detection equipment and relevant detection technique is reliable and disadvantage of time consuming. For example, working time in field usually excesses 1 hour and it is approximately one-third of the total supervisory inspection time of the entire elevator.

As aforementioned prior art elevator balance coefficient detection method is time consuming and tedious, in recent years free-loaded balance coefficient detection technique has been developed eventually and some good effects have been brought by this new detection method. Examples of these new techniques include detection apparatus which is made by Anhui special equipment Inspection institute and in which balance coefficient is determined by detecting tension force of the steel rope located at two sides of the traction wheel, static lateral weight difference detection method and device developed by Liaoning Shihua University, and ADIASYSTEM elevator detection system created by TüV company, Germany. In these techniques there is no load and accordingly, there is no need to repeatedly move test weight. Till now, the problem remains that it employs a force detection device for detection of self weight of the elevator car and counterweight for data collection purpose. As a result, in site installation and detection is inconvenient. In addition, as data collection is performed for elevator static working condition, this is different from dynamic detection result based on Specifications GB/T10059-2009 and TSG T7001-2009. Therefore, use of them is quite limited.

A Chinese patent which publication No. is CN101670965A and issued on Mar. 11, 2010 discloses an elevator balance coefficient detection method. According to this method, upward movement torque Tup and downward movement torque Tdown of the motor running at a constant speed and with free of load is tested and, balance coefficient is achieved using formula (Tup+Tdown)*i/R/Q/2, wherein i is traction ratio, R is radius of the traction wheel, while Q is rated load. One drawback of this detection method lies in more than 20% of error is observed in its detection result which is confirmed by theory analysis and practical experience. The reason is when transmitting the elevator load to the motor, different transmission mechanism therein results in different transmission efficiency; and in addition, power transmission efficiency may be dramatically different for frontward direction (downward movement without load, and the elevator load being driven by mechanical construction of the motor) and backward direction (upward movement without load, and the elevator load driving the motor by the mechanical construction). For instance, widely used worm-gear traction machine has a frontward transmission efficiency of about 60%-80% and backward transmission efficiency of about 0%-40%. This detection method has not considered influence of the transmission efficiency upon detection results. Another drawback lines in detection accuracy of the motor torque as realized completely by motor torque detection function of the inverter cannot meet requirement as set forth in "Lift-testing method" (GB/T10059-2009).

SUMMARY OF THE INVENTION

The object of the invention is to overcome drawbacks of prior art and provide an elevator balance coefficient detection method and device which are easy to implement and have accurate detection result.

An elevator balance coefficient detection method of the invention includes the following steps:

(1) connecting an electrical energy detection device to a power line of an elevator driving motor, and connecting a speed detection device to a mechanical transmission member of an elevator car;

(2) measuring and recording in real time the car speed data and driving motor power data when the car and a counterweight move to a same horizontal location; and (3) based on above detection data and basic parameters of the elevator to be tested, and according to transmission relationship between the elevator's operating condition and energy during operation, calculating and obtaining the value of the balance coefficient.

For elevators employing traction machine without gears, cylindrical gear traction machine, or planetary gear traction machine, belt-transmission traction machine, and under condition of upward and downward movement free of load in site, the balance coefficient is calculated based on below formula:

$$K = \frac{N_X}{QgV_X(2-\eta)}$$

wherein: K is balance coefficient of the tested elevator, $N_x$ is the power value in W when the car without load moves downward to a same horizontal location as the counterweight, $V_x$ is the speed value of the car in m/s when the car without load moves downward to a same horizontal location as the counterweight, Q is rated load mass in kg, g is acceleration of the gravity and assigns the value of 9.81 m/s², while η is transmission efficiency, $$\eta = 1 - \frac{N_X V_S - N_S V_X}{N_S V_X + N_X V_S}$$

Wherein, $N_s$ is the power value in W when the car without load moves upward to a same horizontal location as the counterweight, $V_s$ is the speed value of the car in m/s when the car without load moves upward to a same horizontal location as the counterweight, and other parameters in this formula have the same meaning as those aforementioned.

For elevator employing worm-gear traction machine, condition is selected under which the elevator moves downward free of load and moves downward with load for one time, and the balance coefficient is calculated based on below formula:

$$K = \frac{Q_d V_d}{Q V_X} \times \frac{N_X}{N_X - N_d}$$

Wherein, K is balance coefficient of the tested elevator, Q is rated load mass in kg, $Q_d$ is added load mass in kg during detection process when the car moves downward, which is recommended to choose in the range of 10%-15% of the rated load mass, $N_x$ is the power value in W when the car without load moves downward to a same horizontal location as the counterweight, $N_d$ is the power value in W when the car with load Qd moves downward to a same horizontal location as the counterweight, $V_x$ is the speed value of the car in m/s when the car without load moves downward to a same horizontal location as the counterweight, while $V_d$ is the speed value of the car in m/s when the car with load $Q_d$ moves downward to a same horizontal location as the counterweight.

For performing the above detection method, the elevator balance coefficient detection device is designed according to the following technical solutions:

The elevator balance coefficient detection device includes an elevator data acquiring system and a detection data processing system. The elevator data acquiring system comprises an elevator electrical energy detection device and an elevator operation speed detection device, and the elevator electrical energy detection device is connected to a power line of a traction machine through a current transducer and a voltage input terminal for acquiring operational electrical energy information of the driving motor; the elevator operation speed detection device is mounted on a mechanical transmission component of the car for acquiring displacement information of the operation of the car; and the elevator energy detection device and speed detection device are coupled with the detection data processing system respectively for analyzing, calculating, storing and outputting detection result.

The elevator electrical energy detection device is an AC broadband power measuring device and is applied in the range of 5-60 Hz. The elevator speed detection device is a steel rope displacement measuring device employing a photoelectric mouse chip suite or a tachometer type speed measuring device. The steel rope displacement measuring device employing a photoelectric mouse chip suite includes a guiding wheel having a rope groove disposed on a device bracket; the guiding wheel is constructed of magnetic material and the guiding wheel has magnetic absorption force to the steel rope to be tested.

Compared to prior art, the invention obtains the following good effects:

1. The detection data only includes elevator operation power and speed, and both of them can be directly measured in elevator operating site;

2. detection means and devices of the elevator operation power and speed are reliable in the art, and they can follow corresponding technical standards, thus ensuring detection accuracy;

3. Installation of the devices in site is quick and convenient and it usually only takes about 10 minutes, thereby saving time and labor; and 4. detection data is accurate, and detection data is consistent with that obtained according to standards of GB/T 10059-2009 and TSG T7001-2009.

In these drawings, 1 denotes elevator traction machine, 2 is a steel rope, 3 is a car, 4 is a counter weight, 5 is an electrical energy detection device, 6 is a detection data processing system, 7 is a speed detection device, 8 is a guiding wheel, 9 is an photoelectric lens, 10 is a circuit for a photoelectric mouse, 11 is a device bracket, 12 is a bearing, 13 is a mandrel, and 14 is alnico component.

DETAILED DESCRIPTION OF THE INVENTION

The present invention will be described below in conjunction with drawings and embodiments.

Figure 1:
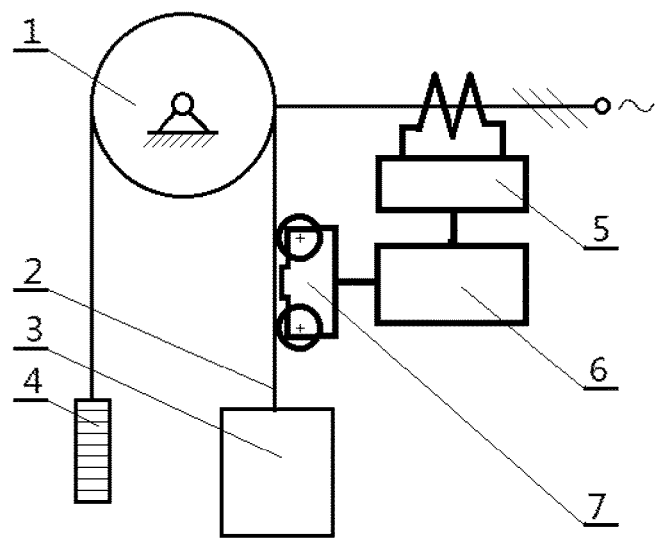
FIG. 1 shows a schematic structural view of an embodiment of the present invention.

As shown in FIG. 1, an elevator balance coefficient detection method according to the present invention includes the following steps:

Measure linear speed of the elevator steel rope 2 by using a speed detection device 7 to obtain the operation speed of the elevator car 3;

Acquire operation power information of the elevator traction machine 1 in real time by using the electrical energy detection device 5; and Collect detection data using the detection data processing system 6 and calculate the value of the balance coefficient according to the transmission relationship between the elevator's operating condition and energy during operation.

Establishing and deduction of the calculation formulae are described below.

1. For elevators employing traction machine without gears, cylindrical gear traction machine, or planetary gear traction machine, belt-transmission traction machine, and under condition of upward and downward movement free of load in site:

(1) When the elevator car moves downward without load and the motor electrically runs, in electrical consumption status, its operation power may be expressed with the formula:

$$N_x = KQgV_x + KQgV_x(1-\eta) \quad \text{Formula 4}$$

(2) When the elevator car moves upward without load and the motor is in an electricity generative status, its operation power may be expressed with the formula:

$$N_s = KQgV_s + KQgV_s(1-\eta) \quad \text{Formula 5}$$

(3) In formulae 4 and 5, K and η are unknown quantities, while Q, g, $N_x$, $N_s$, $V_x$, and $V_s$ are elevator parameters or detection data and are known numbers. These two expressions may be combined to form a group of equations of two variables:

$$\begin{cases} N_S = KQgV_S - KQgV_S(1-\eta) \\ N_X = KQgV_X - KQgV_X(1-\eta) \end{cases}$$

The following equations are obtained by calculation:

$$\eta = 1 - \frac{N_X V_S - N_S V_X}{N_S V_X + N_X V_S} \quad \text{Formula 2}$$

$$K = \frac{N_X}{QgV_X(2-\eta)} \quad \text{Formula 1}$$

2. For elevator employing worm-gear traction machine, as there is great difference in power transfer efficiency η between frontward (downward movement without load, and the elevator load driving the motor by the mechanical construction) and backward (upward movement without load, and the elevator load being driven by mechanical construction of the motor) direction of the worm-gear wheel, condition is selected under which the elevator moves downward free of load and moves downward with load for one time.

(1) When the elevator car moves downward without load and the motor electrically runs, its operation power may be expressed with the formula:

$$N_x = KQgV_s + KQgV_s(1-\eta) \quad \text{Formula 6}$$

The following formula 7 is obtained:

$$K = \frac{N_X}{QgV_X(2-\eta)} \quad \text{Formula 7}$$

(2) When the elevator car moves downward with load $Q_d$ and the motor electrically runs, its operation power may be expressed with the formula:

$$N_d = N_x - [Q_d g V_d + Q_d g V_d (1-\eta)] \quad \text{Formula 8}$$

The following formula is obtained:

$$\frac{N_X - N_d}{Q_d g V_d} = (2-\eta) \quad \text{Formula 9}$$

(3) Using formula 9 in formula 7, the following formula 10 is obtained:

$$K = \frac{N_X}{QgV_X} \times \frac{Q_d g V_d}{N_X - N_d} \quad \text{Formula 10}$$

Then, it is obtained:

$$K = \frac{Q_d V_d}{QV_X} \times \frac{N_X}{N_X - N_d} \quad \text{Formula 3}$$

In the embodiment shown in FIG. 1, the energy detection device 5 is a broadband power detection apparatus. Considering that variable voltage and variable frequency techniques are extensively utilized in electrical traction system of the elevator, power frequency of the traction machine is normally in the range of 10-50 Hz. Therefore, standard frequency energy detection device cannot meet requirement. The device of the present invention has its application as follows: three phase alternative current with frequency of 5-60 Hz, voltage of 0-500V and current of 0-200 A. The speed detection device 7 is a photoelectric steel rope displacement measuring device and is disposed at one side of the elevator traction steel rope. By measuring linear speed of the elevator traction steel rope or speed limiting steel rope, operation speed of the elevator car may be calculated. The energy detection device 5 and speed detection device 7 are coupled with the detection data processing system 6 respectively for analyzing, calculating, storing and outputting the acquired information.

Figure 2:
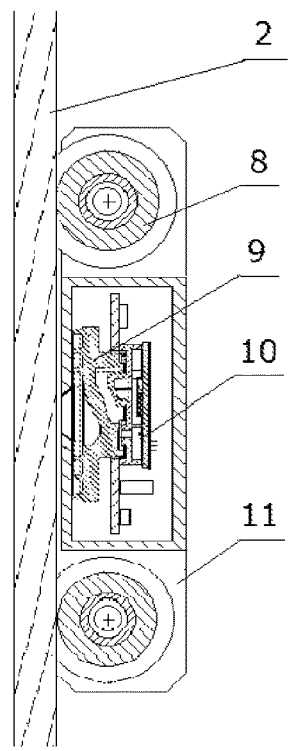
FIG. 2 shows a cross sectional view of an elevator speed detection device of an embodiment of the invention.

In the embodiment shown in FIG. 2, the elevator steel rope displacement measuring device is composed of a photoelectric lens 9, a photoelectric mouse chip circuit 10, a guiding wheel 8 and a device bracket 11. The photoelectric mouse chip circuit has its marketplace toward no-touch displacement measuring of moving object using general computer mouse. The photoelectric mouse chip circuit includes basic modules such as image capturing system, DSP processor and output converter. A photoelectric lens such as a miniature camera is placed on a bottom portion of the photoelectric mouse chip circuit. The image capturing system continuously takes photos of object surface through said photoelectric lens, and then transmits the image information to the DSP processor. The DSP processor compares the image information obtained at an immediately previous time and that of current time and finally obtains movement direction and value of the displacement.

Figure 3:
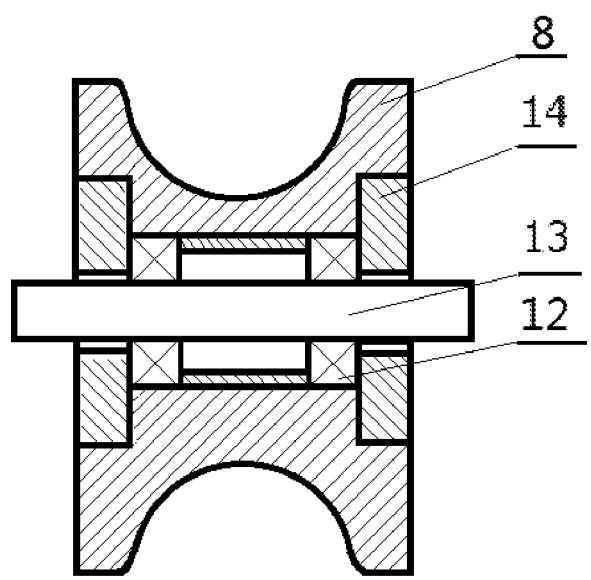
FIG. 3 shows a cross sectional view of a guiding wheel of the elevator speed detection device of an embodiment of the invention.

In the embodiment shown in FIG. 3, two sides of the guiding wheel 8 is provided with alnico component 14 such that there is magnetic absorption force between the guiding wheel and steel rope to be tested. The purpose of this construction is to press the guiding wheel tightly against the steel rope to be tested due to magnetic absorption force during detection process, and maintain relative location between the detection device and steel rope to be tested. The guiding wheel is mounted on the device bracket 11 by the mandrel 13 and bearing 12.

In present invention, the elevator operation speed may be measured using a tachometer type speed measuring device for example EC-2100 elevator speed meter. During measuring process, contact between the cylindrical speed ring (also known as speed measuring roller) of the speed meter and elevator traction steel rope or speed limiting steel rope in operation should be slightly maintained to obtain the linear speed of the steel rope. Or, rotation speed of the driving motor may be measured and then operation speed of the car is calculated according to rules prescribed in Specification-GB/T 10059-2009.

Embodiment 1

Elevator parameters: rated load mass: Q=1050 kg, rated speed: V=1.5 m/s, raising height: H=16 m, traction ratio of the steel rope: i=2, and using of permanent magnet synchronous traction machine.

Measuring method under condition of upward movement without load and downward movement without load including the steps of:

1. The AC broadband power measuring device is electrically connected to the power line of the traction machine through a clamp transducer and a voltage input terminal for acquiring operation power information of the traction machine; and a photoelectric displacement detection device is located to the steel rope for collecting operation speed of the elevator car and distance.

2. Let the elevator move back and forth from a bottom floor to a top floor without load, and detection data at time when the elevator car moves to a location corresponding to ½ of the raising height is selected, including $N_x$=8249 W, $N_s$=5670 W, $V_x$=1.50 m/s and $V_s$=1.51 m/s.

3. Apply the formulae (1) and (2) to calculate that k=0.457.

detection is performed in consistence to Specification-GB/T10059-2009 and it is obtained that balance coefficient K=0.45.

Embodiment 2

Elevator parameters: rated load mass: Q=2000 kg, rated speed:
V=1 m/s, raising height: H=26 m, traction ratio of the steel rope: i=1, and using of worm-gear traction machine.

Detection method under condition of downward movement without load and downward movement with load at a time including the steps of:

1. The AC broadband power measuring device is electrically connected to the power line of the traction machine through a clamp transducer and a voltage input terminal for acquiring operation power information of the traction machine; and a photoelectric displacement measuring device is located to the steel rope.

2. Control the elevator such that it moves without load from the top floor to the bottom floor and then stops; real time operation power information of the motor is acquired through a power sensor; and real time displacement information of the car is acquired by using a speed sensor.

3. Control the elevator such that it stops at the top floor, add detection weight of $Q_d$=200 kg into the car, let the elevator move with this load from the top floor to the bottom floor and then stop at the bottom floor; real time operation power information of the motor is acquired through a power sensor; and real time displacement information of the car is acquired by using a speed sensor.

4. The above devices record, analyze and calculate the obtained data and then it is obtained that $N_x$=12480 W, $V_x$=0.96 m/s, $N_d$=3141 W and $V_d$=0.98 m/s and K=0.477.

detection is performed in consistence to Specification-GB/T10059-2009 and it is obtained that balance coefficient K=0.485.

Though various embodiments of the invention have been illustrated above, the description and the drawings are not the limitation to the invention. A person of ordinary skill in the art will understand that, variations and improvements made upon the illustrative embodiments fall within the scope of the invention, and the scope of the invention is only limited by the accompanying claims and their equivalents.

What is claimed is:

1. An elevator balance coefficient detection device, comprising:
   an elevator data acquiring system and a detection data processing system, wherein the elevator data acquiring system comprises an elevator electrical energy detection device and an elevator operation speed detection device, and the elevator electrical energy detection device is connected to a power line of a traction machine through a current transducer and a voltage input terminal for acquiring operational electrical energy information of the driving motor; the elevator operation speed detection device is mounted on a mechanical transmission component of the car for acquiring displacement information of the operation of the car; and the elevator energy detection device and speed device are coupled with the detection data processing system respectively for analyzing, calculating, storing and outputting detection result;
   wherein the elevator speed detection device is a steel rope displacement measuring device employing a photoelectric mouse chip circuit component and;
   wherein said elevator balance coefficient detection device is used for elevator balance coefficient detection which comprises the following steps:
   (1) connecting an electrical energy detection device to a power line of an elevator driving motor, and connecting a speed detection device to a mechanical transmission member of an elevator car;
   (2) measuring and recording in real time the car speed data and driving motor power data when the car and a counterweight move to a same horizontal location; and
   (3) based on above detection data and basic parameters of the elevator to be tested, and according to transmission relationship between the elevator's operating condition and energy during operation, calculating and obtaining the value of the balance coefficient.

2. The elevator balance coefficient detection device according to claim 1, wherein the steel rope displacement measuring device employing an photoelectric mouse chip circuit component includes a guiding wheel having a rope groove disposed on a device bracket; the guiding wheel is constructed of magnetic material and the guiding wheel has magnetic absorption force to the steel rope to be tested.

* * * * *